(12) United States Patent
Diglio

(10) Patent No.: US 10,393,592 B2
(45) Date of Patent: Aug. 27, 2019

(54) SYSTEMS AND METHODS FOR MEASURING SURFACE TEMPERATURE

(71) Applicant: Intel Corporation, Santa Clara, CA (US)

(72) Inventor: Paul J. Diglio, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 15/386,768

(22) Filed: Dec. 21, 2016

(65) Prior Publication Data
US 2018/0172521 A1    Jun. 21, 2018

(51) Int. Cl.
| | |
|---|---|
| *G01K 7/00* | (2006.01) |
| *G01K 1/00* | (2006.01) |
| *G01K 3/00* | (2006.01) |
| *G01K 3/14* | (2006.01) |
| *G01K 1/02* | (2006.01) |

(52) U.S. Cl.
CPC .............. *G01K 3/14* (2013.01); *G01K 1/024* (2013.01); *G01K 1/026* (2013.01); *G01K 2213/00* (2013.01)

(58) Field of Classification Search
USPC .................... 374/183, 208, 166, 137, 179
See application file for complete search history.

(56) References Cited

U.S. PATENT DOCUMENTS

| | | | | | |
|---|---|---|---|---|---|
| 4,265,117 | A | * | 5/1981 | Thoma ..................... | G01K 7/00 136/221 |
| 4,321,827 | A | * | 3/1982 | Anderson ................ | G01K 7/00 338/25 |
| 4,444,990 | A | * | 4/1984 | Villar ....................... | G01K 7/04 136/221 |
| 4,702,619 | A | * | 10/1987 | Camp ...................... | G01K 7/22 116/303 |
| 6,084,215 | A | * | 7/2000 | Furuya .............. | H01L 21/67248 118/500 |
| 8,118,486 | B2 | * | 2/2012 | Nyffenegger ............ | G01K 7/16 338/22 R |
| 2007/0217480 | A1 | * | 9/2007 | Lai .......................... | G01K 1/143 374/208 |
| 2010/0135357 | A1 | * | 6/2010 | Chancy ................. | G01B 5/0014 374/179 |

* cited by examiner

*Primary Examiner* — Mirellys Jagan
(74) *Attorney, Agent, or Firm* — Schwegman Lundberg & Woessner, P.A.

(57) ABSTRACT

Disclosed is a system for measuring a surface temperature. The system may comprise a printed circuit board, an insulator block, a conductive probe, a plurality of temperature sensors, and a plurality of compressive contact pins. The conductive probe may have a first surface and a second surface opposite the first surface. The conductive probe may be coupled to the insulator block. The plurality of temperature sensors may be coupled to the insulator block and translatable in a first direction within the insulator block. Translation of the plurality of temperature sensors in the first direction may cause each of the plurality of temperature sensors to contact the first surface of the conductive probe. The plurality of compressive contact pins may each be electrically couple a corresponding temperature sensor to the printed circuit board.

15 Claims, 11 Drawing Sheets

SYSTEMS AND METHODS FOR MEASURING SURFACE TEMPERATURE

TECHNICAL FIELD

Embodiments described generally herein relate to temperature measurement. More particularly, embodiments described generally herein relate to measuring surface temperatures of a sample.

BACKGROUND

In the semi-conductor TEST/SORT industry maintaining accurate and stable die temperature is one of the fundamental objectives/requirements for the toolsets within the industry. The responsibility of guaranteeing the die temperature falls on the metrology used. Often within the test industry a temperature controlled surface may be used to either introduce or remove heat from the device being tested, sometimes referred to as a device under test (DUT). One inherent problem is that maintaining a known temperature across a test surface may be difficult due to size, material characteristics, etc.; especially under dynamic conditions such as temperature ramping up and down.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As disclosed herein, a device used to measure surface temperature can include a routing printed circuit board (PCB), an interposer, and gimbaling temperature sensors. The routing PCB may be used to direct electrical signal from the temperature sensor from an array of temperature sensors to a measuring meter (e.g., a multi-meter, data acquisition software, etc. The interposer may host multiple double-actuated compressive contact pins, sometimes referred to as pogo-pins, for compliance/electrical connectivity between the temperature sensors and the PCB.

The gimbaling temperature sensors may include resistant temperature devices (RTD). The RTDs may be mounted in a gimbaling mount. The RTD mounts may use the interposer and pogo-pins for compression load and electrical connection to PCB. The RTD-mounts may be constrained in rotation while still allowing limited gimbaling of the RTD sensing surface to establish co-planar contact with the sample. In addition, a 4-wire measurement may be established via the pogo-pins thereby minimizing electrical contact resistance issues. The interposer block and other housing materials proximate the RTDs or other temperature sensors may act to thermally isolate the temperature sensors from the surroundings and from the electrical connection path above (e.g., the interposer block, etc.).

As disclosed herein, an approach for surface temperature measurement may include using a compact array of carefully calibrated springed-temperature sensors arranged in a 2D-array format. The temperature sensors may be connected to spring type members that allow for sensor compliance and gimbaling. In addition, a 4-wire reading may be utilized to reduce sensor to sensor variation. The 4-wire measurement may happen after the pogo-pins (or spring connectors) for increased effectiveness.

Figure 1:
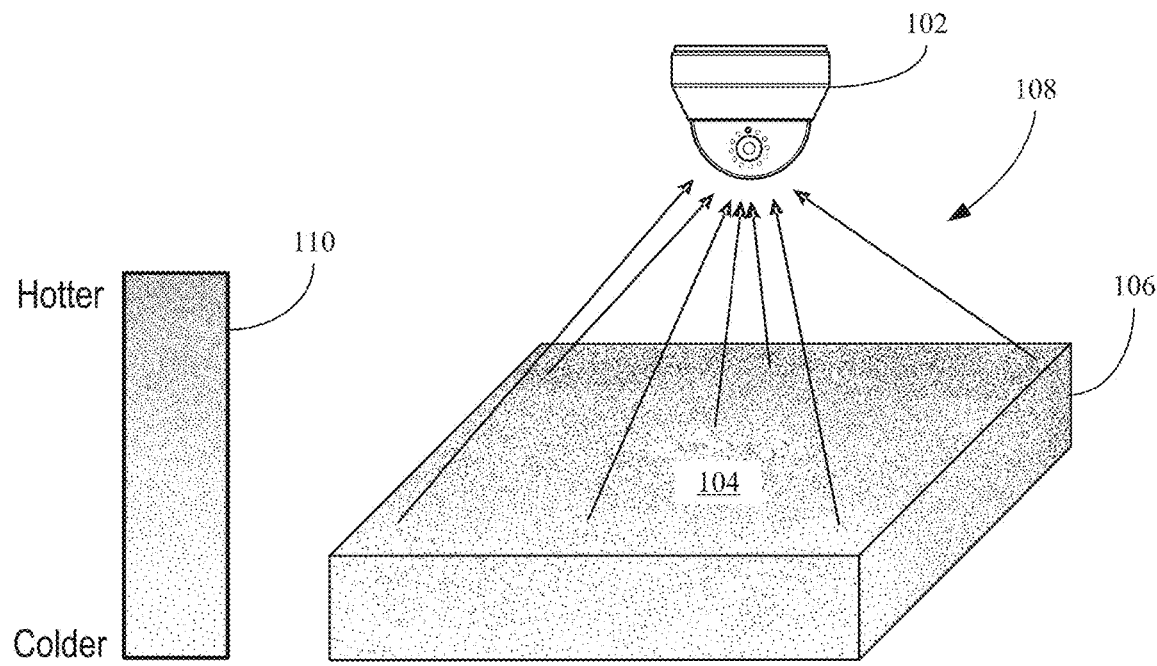
FIG. 1 illustrates a schematic of for touchless surface temperature measurement in accordance with some embodiments disclosed herein.

One metrology for determining a surface temperature gradient has been an infrared (IR) camera. As shown in FIG. 1, an IR camera setup may include an IR camera 102 located above a surface 104 of a sample 106. The sample 106 may emit IR radiation 108 that is collected by the IR camera 102. The IR camera 102 or other external computing devices can create a temperature profile have boundaries defined by a temperature scale 110.

IR cameras may yield a high point-to-point (relative) accuracy of a temperature gradient for the surface 104. However, one drawback of IR cameras is they may have relatively low absolute accuracy and thus, require a secondary metric/reference to assure absolute accuracy. In addition, IR cameras may be relatively large in dimensional size limiting applications or conditions of use. Since IR cameras are line-of-site based, optics can also be an issue with their use. In addition, IR cameras may require the surface 104 to have an emissivity within a predefined range for the IR camera to accurately access the surface temperature. The range of emissivity may limit the raw materials that can be directly measured or the materials may need a coating to increase the emissivity.

Figure 2:
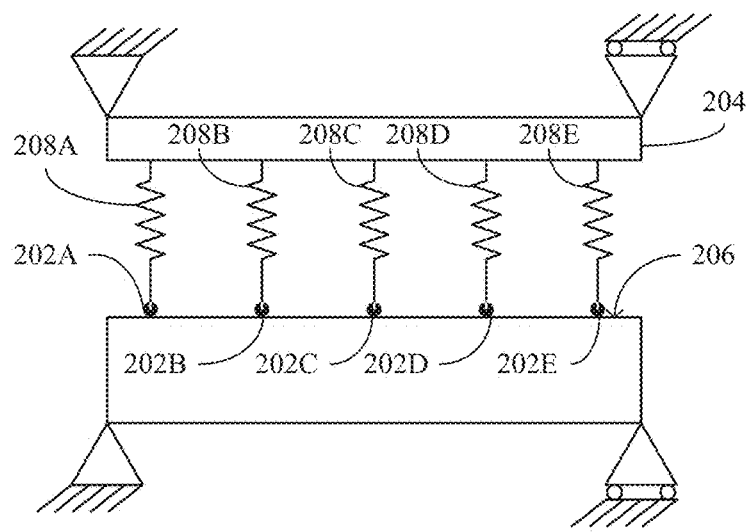
FIG. 2 illustrates a schematic for touch surface temperature measurement in accordance with some embodiments disclosed herein.

Use of an IR camera is an example of a touchless method for measuring surface temperature. FIG. 2 illustrates an example of a touch method for measuring surface temperature. As shown in FIG. 2, temperature sensors 202A, 202B, 202C, 202D, and 202E (collectively temperature sensors 202) may be disturbed across a fixture 204. The temperature sensors 202 may be thermocouples, resistant temperature devices (RTD), thermistors, or temperature-diodes. The temperature sensors 202 may be pressed against a surface 206 with a spring or spring-like material 208A, 208B, 208C, 208D, and 208E (collectively springs 208).

During contact with the surface 206, the metrology should have minimal impact on the surface 206 and thus, thermal isolation for all hardware outside of the temperature sensors 202 may be needed. Another technical issue may be quantifying and removing the sensor to sensor variation from data so only the true surface temperature is reported. As shown in FIG. 2, the physical contact with the surface 206 may be accomplished at multiple measurement points with each temperature sensor pressed via spring-force against the surface 206. The non-co-planarity between the fixture 204 and the surface 206 may be accounted for via the compliance of the individual sensors.

Figure 3:
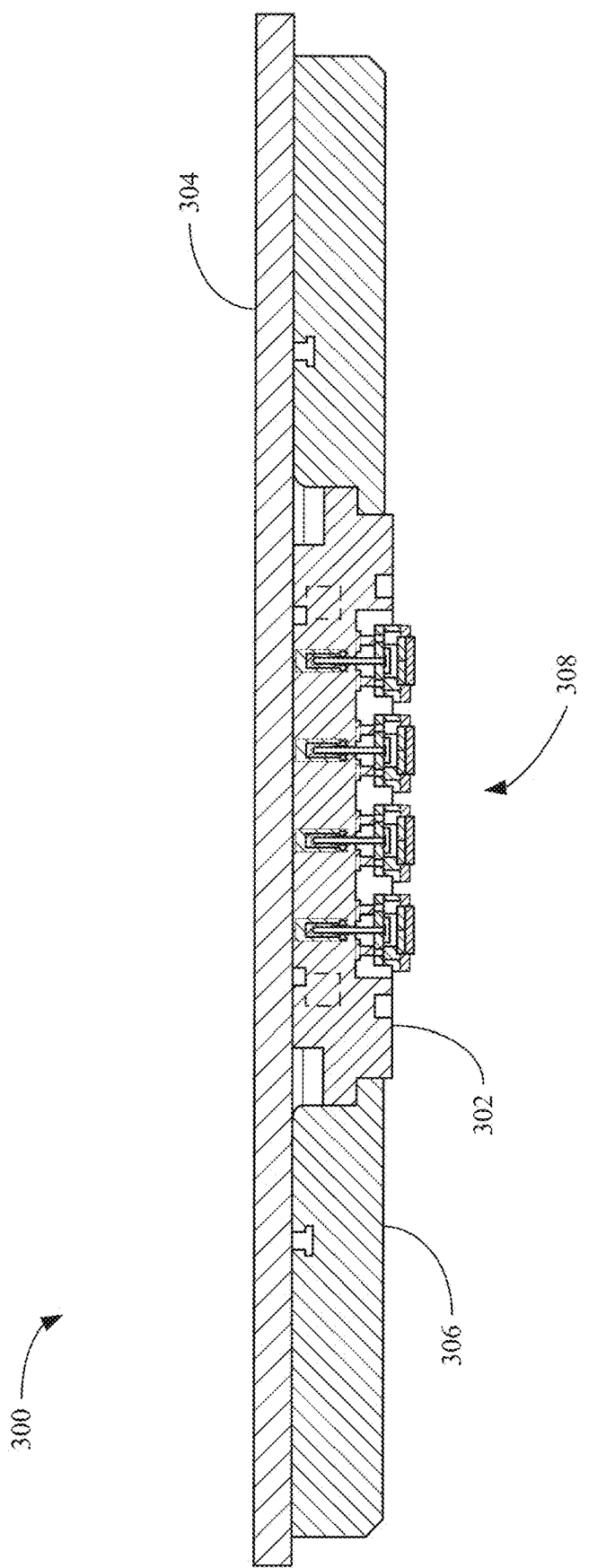
FIG. 3 illustrates a temperature sensor array in accordance with some embodiments disclosed herein.
Figure 4A:
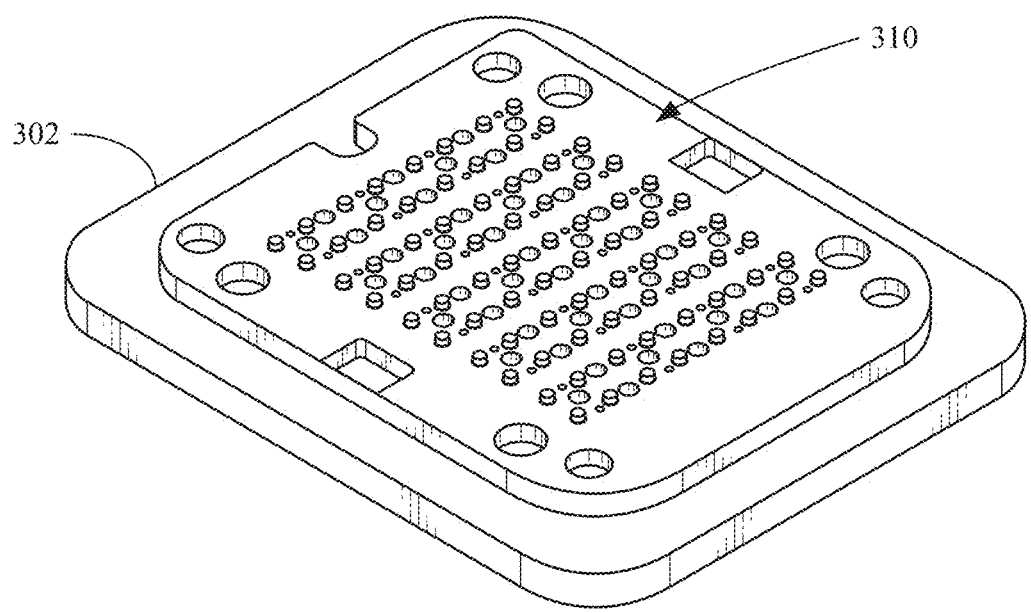
FIGS. 4A and 4B illustrate perspective views of an interposer block in accordance with some embodiments disclosed herein.
Figure 4B:
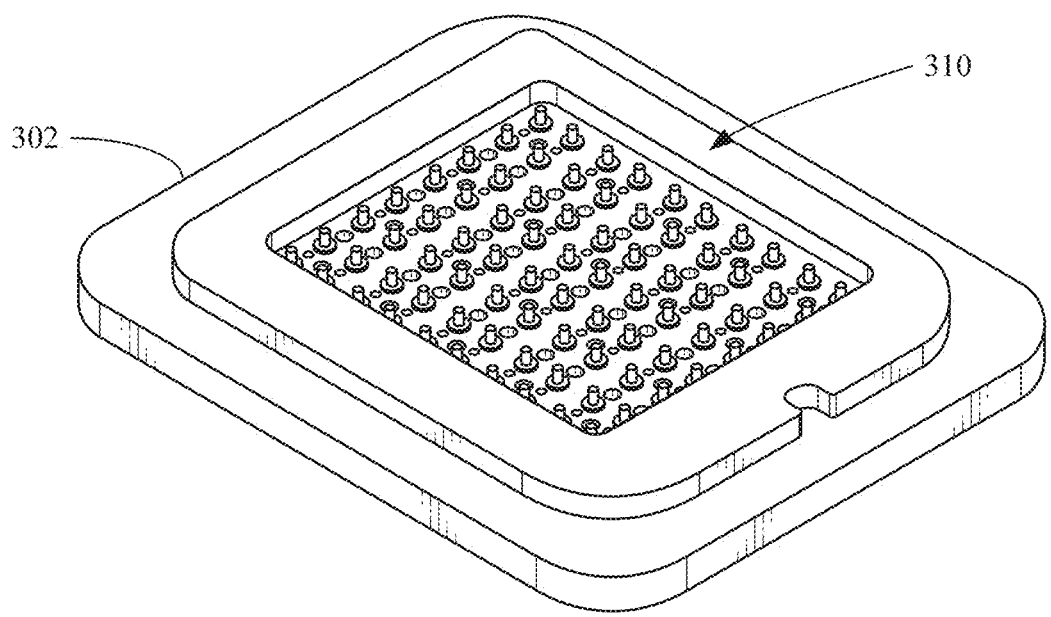
Figure 5A:
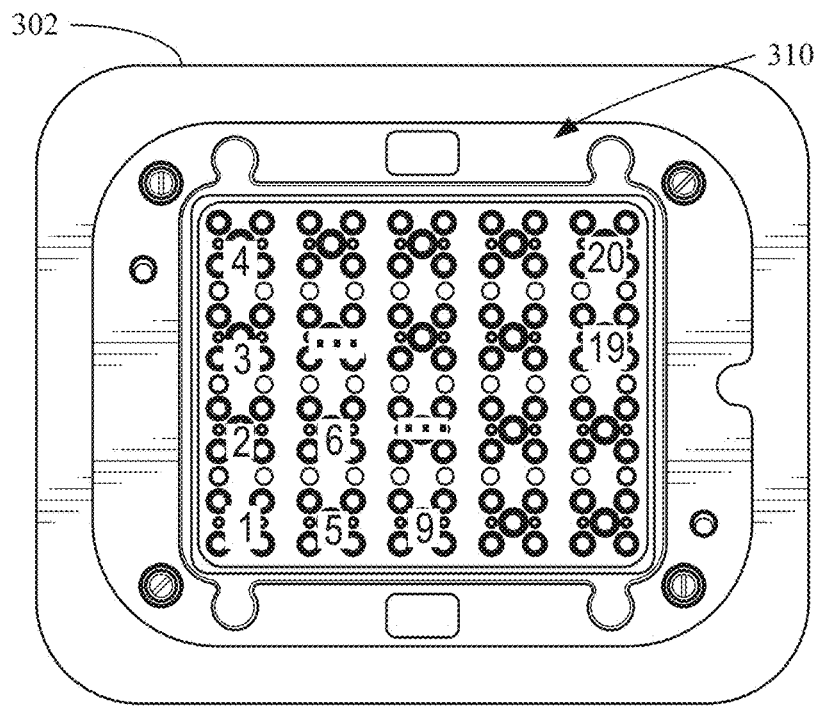
FIGS. 5A and 5B illustrate a top plan view and a bottom plan view of an interposer block, respectively, in accordance with some embodiments disclosed herein.
Figure 5B:
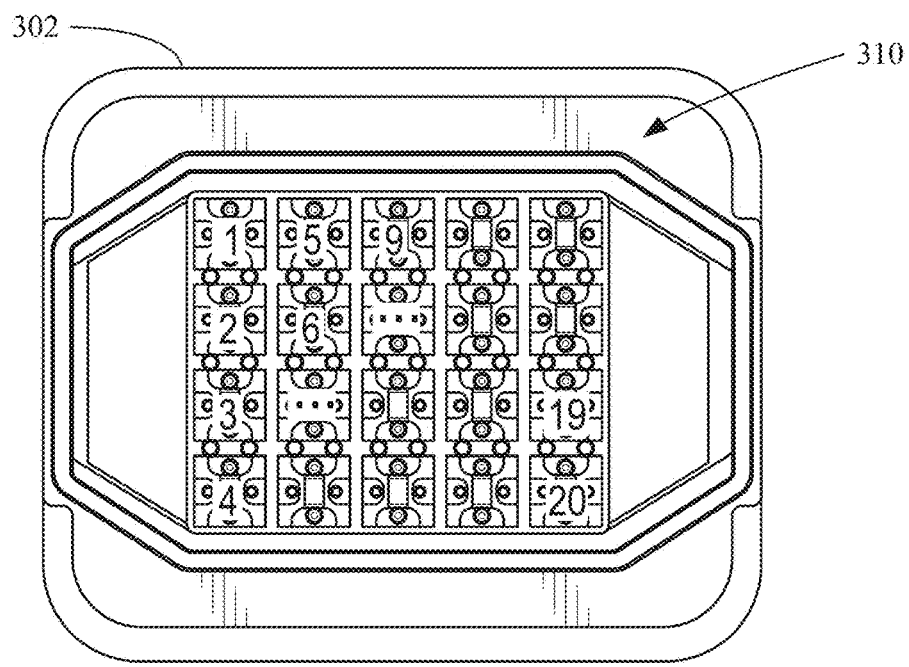

Turning now to FIG. 3, FIG. 3 illustrates a test head 300 in accordance with some embodiments disclosed herein. The test head 300 may include an interposer block 302, a routing printed circuit board (PCB) 304, an integration block 306, and a plurality of mount assemblies 308. FIGS. 4A and 4B depict perspective views of the interposer block 302. FIGS. 5A and 5B depict a top plan view and a bottom plan view of the interposer block 302, respectively.

The routing PCB 304 may be a routing board to direct electrical signals from the interposer block 302 and the temperature sensors to a computer interface or other digital reader. The interposer block 302 may be a custom machined from a non-thermally conductive material (e.g., an insulator) and may host numerous mount assemblies 308. As shown in FIGS. 5A and 5B, each of the mount assemblies 308 may have a unique address used for mapping purposes.

Figure 6A:
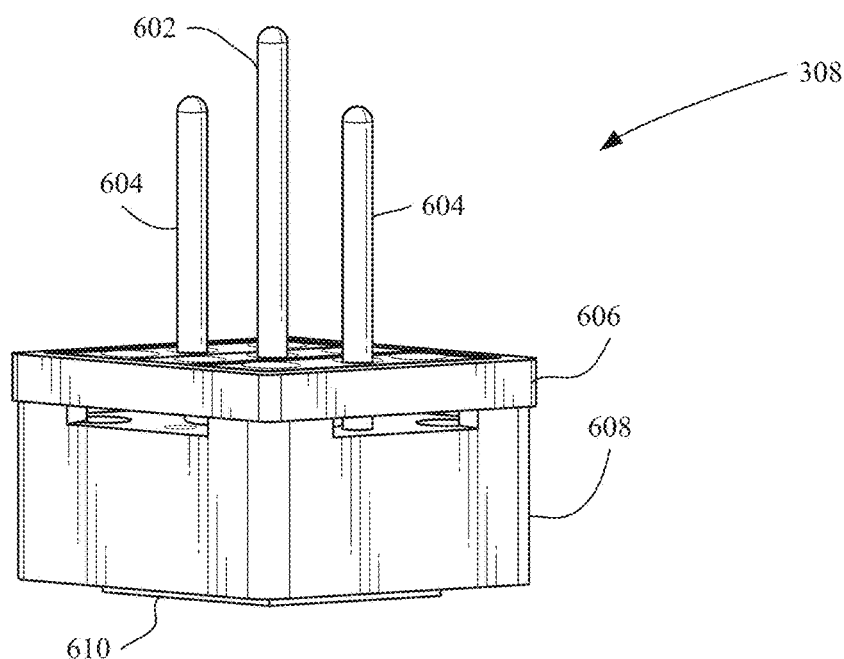
FIGS. 6A, 6B, and 6C illustrate a mount assembly in accordance with some embodiments disclosed herein.
Figure 6C:
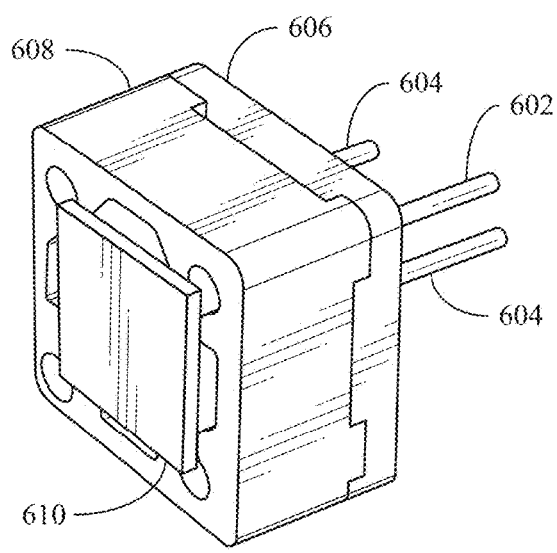
Figure 6B:
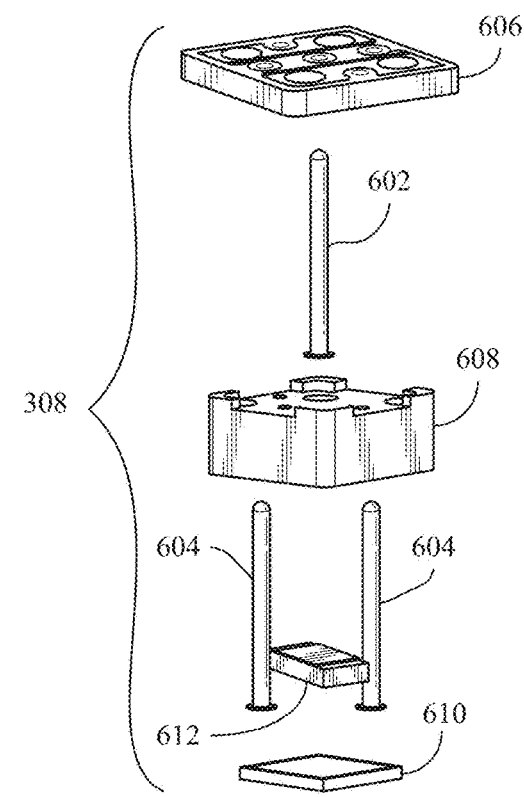

FIGS. 6A, 6B, and 6C illustrate a mount assembly 308 in accordance with some embodiments disclosed herein. The mount assembly 308 may include a center pin 602, one or more side pins 604, a temperature sensor mount 606, an insulator block 608, and conductive probe 610. The conductive probe 610 may also be referred to as a conductive chip. As shown in FIG. 6B, the center pin 602, and the side pins 604 may pass through the temperature sensor mount 606 and the side pins 604 may pass through the insulator block 608. As indicated in FIG. 6B, a temperature sensor 612 may be located between the conductive probe 610 and the insulator block 608. As discussed herein, the temperature sensor 612 can be one or more thermocouples, or RTDs. The PRDs and the PCB may be wire-bonded so as to create a path for electrical signals.

Figures 7A, 7B:
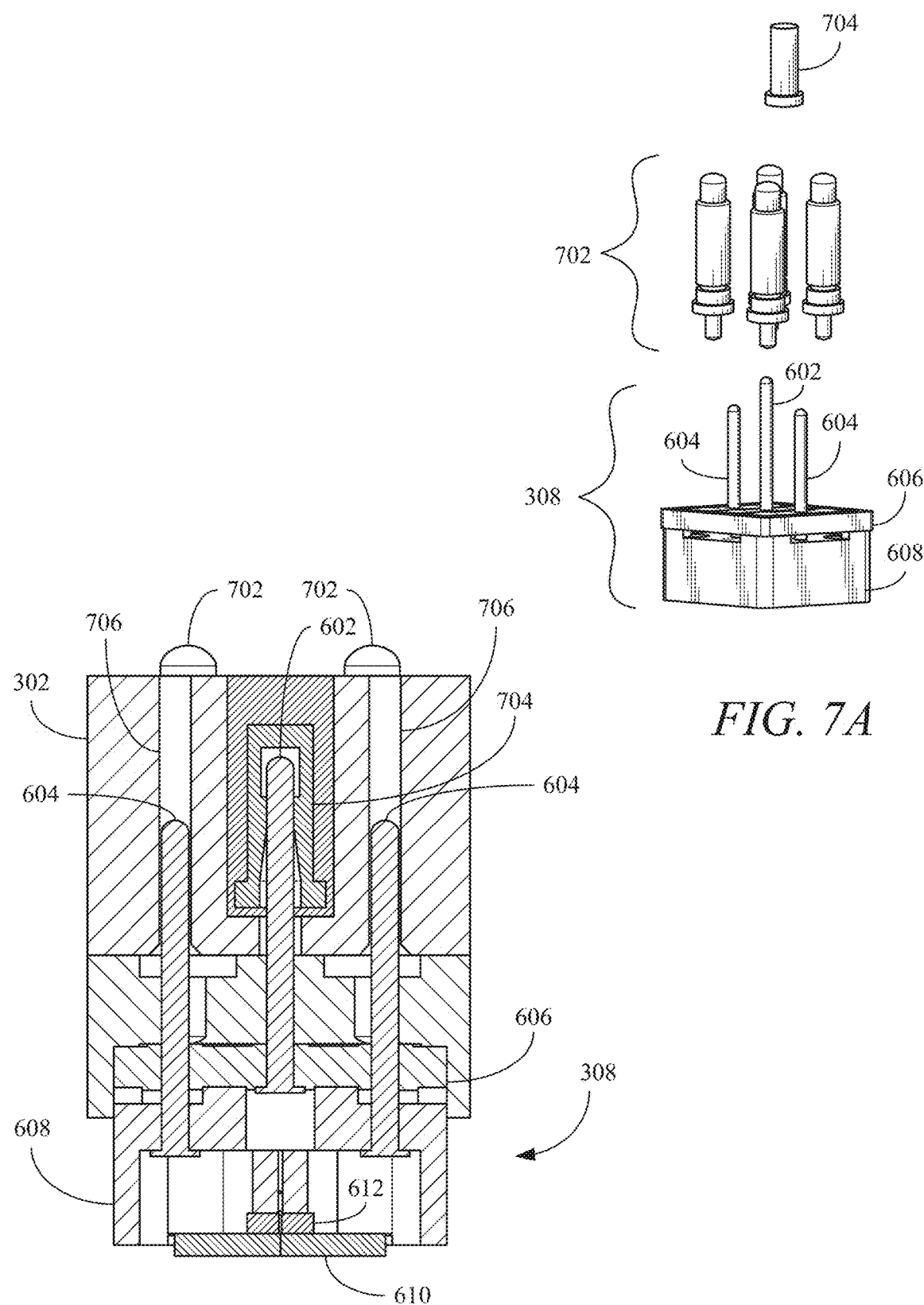
FIGS. 7A, 7B, and 7C illustrate a mount assembly connected to an interposer block in accordance with some embodiments disclosed herein.
Figure 7C:
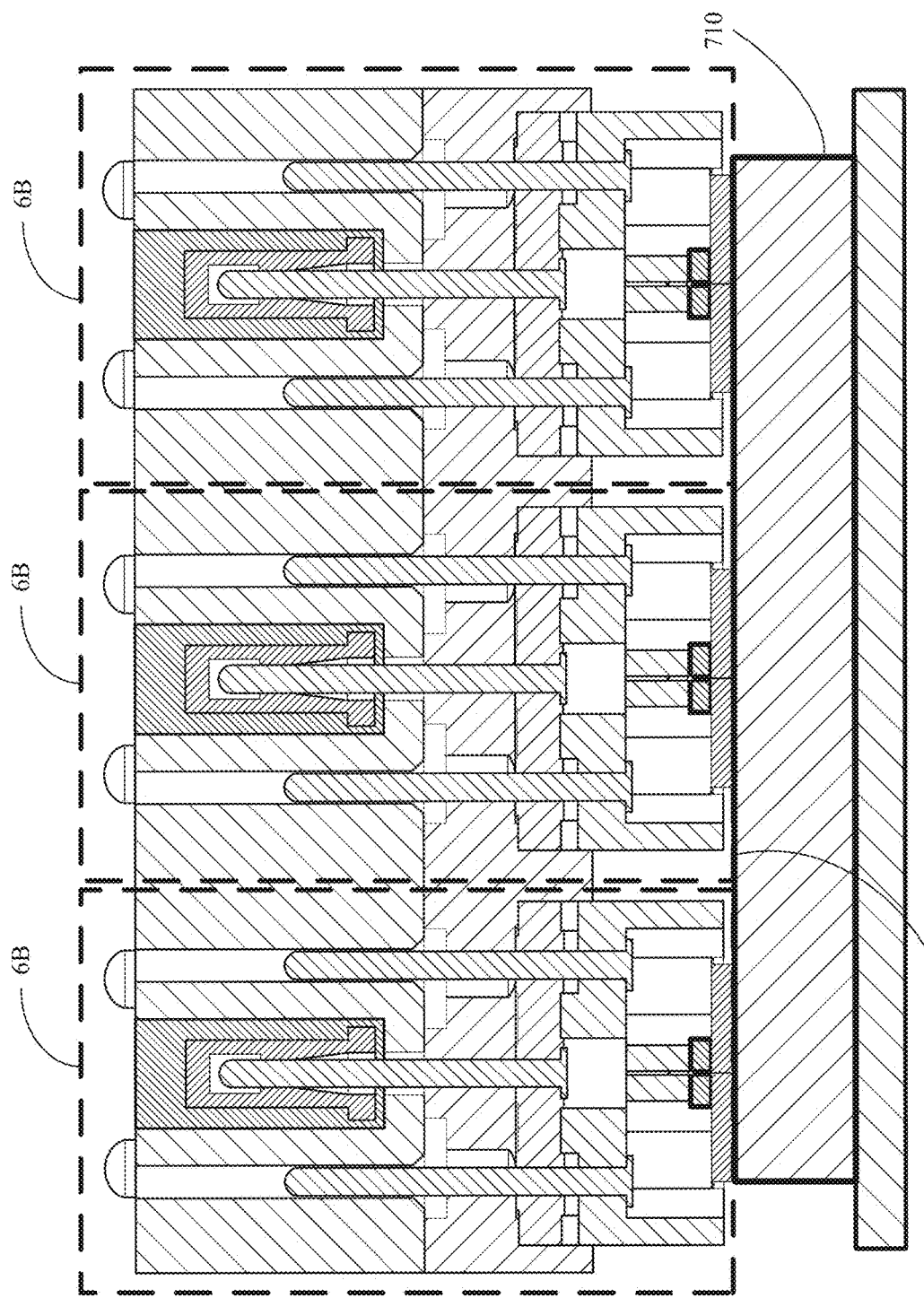

FIGS. 7A, 7B, and 7C illustrate the mount assembly 308 connected to the interposer block 302. As shown in FIG. 7A, each of the mount assemblies 308 may include double-actuated compressive contact pins (sometimes referred to as pogo-pins 702). The pogo-pins 702 may be used to electrically connect the PCB 304 to the temperature sensor 612. The pogo-pins 702 may be press-fit into the interposer block 302 and hard stopped to maintain a known height and location within the interposer block 302. The interposer block 302 also may provide vertical retention of the pogo-pins 702. A collet 704 may couple with the center pin 602 and secure the mount assembly 308 to the interposer block 302. The side pins 604 may rest within holes 706 and assist in maintaining an orientation of the insulator block 608 and components attached thereto.

As shown in FIG. 7C, the conductive probes 610 of each of the amount assemblies 308 may be pressed against a surface 708 of a sample 710. Because each of the conductive probes 310 are substantially thin (i.e., their lengths and widths are at least an order of magnitude greater than their heights), the conducive probes 310 can flex and conform to any surface irregularities of the surface 708. In addition, because the conductive probes are highly conductive (i.e., their thermal conductive is at least greater than 400 watts per meter Kelvin) and are relatively small in size (e.g., dimensions of about 4 mm×4 mm by 0.4 mm), they may exhibit properties associated with lumped capacitance models of heat transfer. In other words, given the dimensions of the conductive probe 610 temperature gradients within the conductive probe 610 in any direction may be negligible.

The mount assemblies 308 may provide a location for a 4-wire connection between each of the temperature sensors 612 and an external reader as described herein. The 4-wire connection may allow removal of all, or some of, the routing and pogo-pins-contact variations from the signal. Additionally, the mount assemblies 308 may allow for maximum thermal transfer to the temperature sensors while simultaneously providing a minimum thermal transfer beyond the temperature sensors 612. Thus, metrology impacts to the surface of a test sample may be minimized.

The high thermal coupling to the surface may be achieved by use of the conductive probe 610. The conductive probe 610 may be made of silicon carbide and may measure any size. For example, the conductive probe 610 may measure 4 mm×4 mm×0.4 mm. The conductive probe 610 may be smooth, flat, and highly thermally conductive material. In addition, to silicon carbide, the conductive probe 610 may be made of any material that has a thermal conductivity greater than 400 watts per meter Kelvin, such as diamond. Materials with a thermal conductivity less than 400 watts per meter Kelvin may be used, but with degraded performance. In addition, the conductive probe 610 may be thin and flexible such that the conductive probe 610 may conform to surface irregularities of the test sample. In other words, the conductive probe 610 may flatten or otherwise conform to the surface under test. The conductive probe 610 may also be lightly supported on its four corners for minimal coupling to the insulator block 608. This architecture virtually suspends the temperature sensor 612 in space placing it outside of the heat path of the assembly and thus, minimizing measurement impacts.

The insulator block 608 may be machined out of a highly thermally insulating plastic material. For example, the insulator block 608 may be made of Meldin 7021. The insulator block 608 may be machined so as to minimize contact with the conductive probe 610. For instance and as detailed above, the insulator block 608 may be machined to support the conductive probe 610 at its corners.

The routing PCB 304 may provide gold-plated lands to contact the pogo-pins 702 above in the interposer block 302 and also truncates the 4-wire connection to a 2 wire connection. The wiring connections with the routing PCB 304 and the mount assemblies 308 may utilize minimal gauge wiring. For example, the various wires may have an outside diameter of about 50 microns. Utilizing small wires and other insulating materials, heat-energy may be prevented from reaching the routing PCB 304 so heat gain seen by the conductive probe 310 and the pogo-pins 702 is minimized.

The center pin 602 and the side pins 604 that extend through the routing PCB 304 may be used for mechanical registration and retention to the interposer block 302. The side pins 604 may restrict rotation and may be undersized slightly to allow a level of gimbaling (e.g., +/−3°). The side pins 604 also may hold the lower assembly together by sandwiching the insulator block 302 to the routing PCB 304 via top-side soldering. The center pin 602 may mate with the collet 704, which may be a floating collet, for retention of the mount assembly 308 with the interposer block 302.

The array of various mount assemblies may quantify, in real-time or near real-time, the temperature accuracy and temperature distribution of the test surface. In addition, the contact between the conductive probe 310 and the test surface may be repeatable due to the mechanical ability of each mount assembly 308 to gimbal/compress. Thus, measured temperatures may be more consistent, accurate, and repeatable in comparison to other metrologies.

As disclosed herein, the temperature profile of a test surface may be quantified by compiling the result of a number of discrete points. Each of the discrete points may correspond to a one or more of the temperature sensors 612. The temperature between each of the temperature sensors 612 may be approximated using linear, or other forms of interpolation.

Each of the mount assemblies may be modular to the interposer. Thus, if a fault or other malfunction if a temperature sensor 612 or other component is detected, it can be quickly replaced.

The array of temperature sensors 612 may be calibrated. The calibration may account for thermal heat losses between the temperature sensors 612 themselves and the temperature surface variation (i.e., contact resistance) that may be unique to each sensor. To account for the variable contact resistance a calibration routine may be used to account for the variation.

Calibration can be performed using a relatively thick material (e.g., a copper block 7 mm thick) and embedding multiple temperature sensors around the block. The high thermal conductivity of the calibration block and its large relative thickness to the thickness of the conductive probe 610 may provide an isothermal surface, which can be validated by monitoring the multiple embedded sensors.

The calibration block can be placed in contact with various conductive probes 610 of the various amount assemblies 308. The calibration block may be heated to a series of temperatures actuated by a heater/cooler in contact with the calibration block. When a target temperature is reached and stabilized for a given time, the temperature sensors 612 may be calibrated to the temperature reported by the reference sensors embedded within the calibration block.

Figure 8:
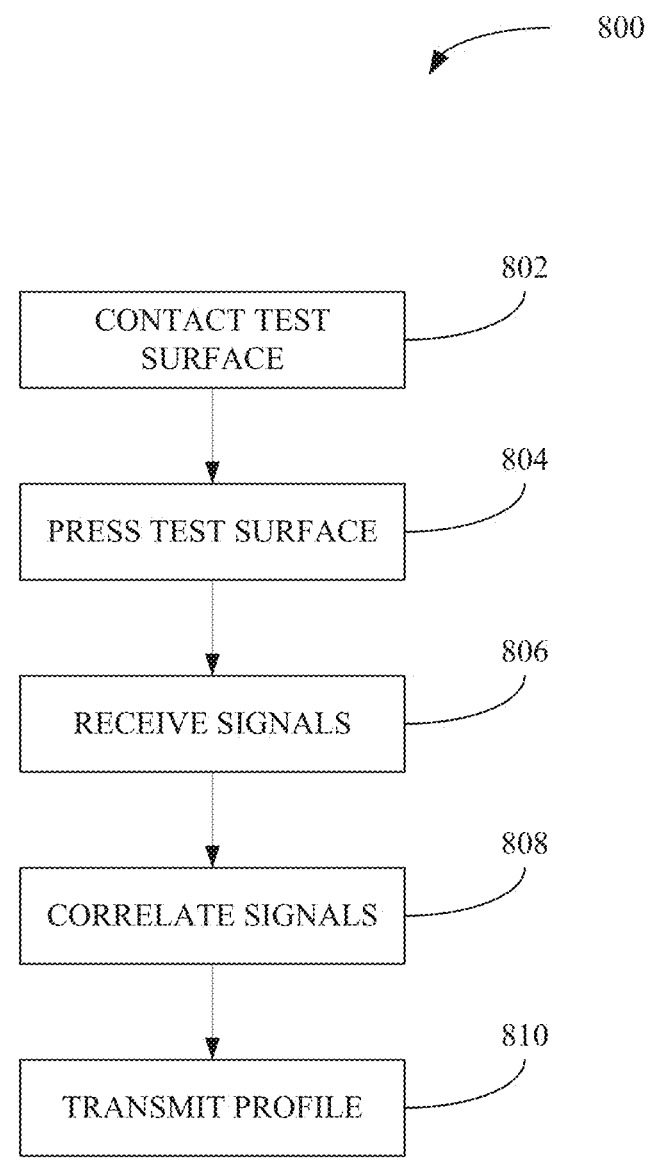
FIG. 8 illustrates a method for measuring a surface temperature in accordance with some embodiments disclosed herein.

Turning now to FIG. 8, FIG. 8 illustrates a method 800 for measuring a surface temperature in accordance with some embodiments disclosed herein. The method 800 begins at stage 802 wherein a surface of a sample may be placed in contact with a plurality of temperature sensors. From stage 802, the method 800 may proceed to stage 804 where the first surface of a conductive probe may be pressed against the surface of the sample such that the plurality of temperature sensors translates in the first direction and contact a second surface of the conductive probe. Pressing the conductive probe against the test surface may cause the conductive probe the conform to any surface irregularities of the test surface.

From stage 804, the method 800 may proceed to stage 806 where an electrical signal may be received from each of the plurality of temperature sensors at a processor. Once received, the method 800 may proceed to stage 808 wherein the electrical signals may be correlated into a temperature profile for the surface of the sample. The voltage or resistance measurements from the temperature sensors may be correlated to a temperature profile using the correlation data obtained as described above. Once the temperature profile has been obtained the method 800 may proceed to stage 810 where the temperature profile may be transmitted to an output device.

Figure 9:
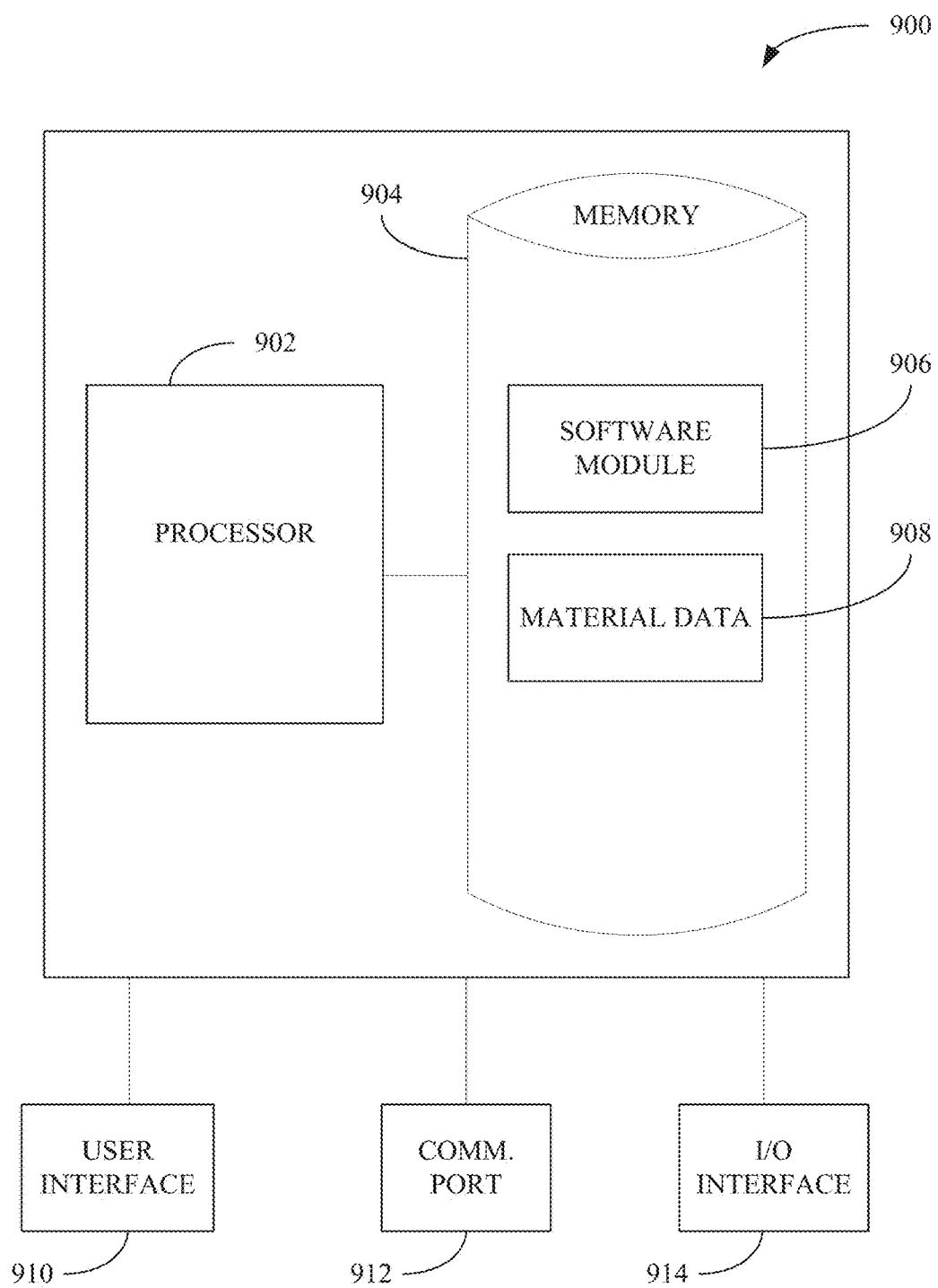
FIG. 9 illustrates a computing device in accordance with some embodiments disclosed herein.

FIG. 9 illustrates an example schematic of computing device 900. As shown in FIG. 9, computing device 900 may include a processor 902 and a memory unit 904. The memory unit 904 may include a software module 906 and material data 908. While executing on the processor 902, the software module 904 may perform processes for measuring surface temperatures, including, for example, one or more stages included in method 800 described above with respect to FIG. 8.

Material data 908 may include the thermal conductivity (for both the sample and components of the test equipment), calibration data, temperature ranges, temperature sensor data (e.g., type, quantity, etc.), sample dimensions, etc. as described herein. The computing device 900 may also include a user interface 910. The user interface 910 can include any number of devices that allow a user to interface with the computing device 900. Non-limiting examples of the user interface 910 can include a keypad, a microphone, a speaker, a display (touchscreen or otherwise), etc.

The computing device 900 may also include a communications port 912. The communications port 912 can allow the computing device 900 to communicate with other computing devices and testing instrumentation such as spectrometers, IR cameras, test heads (such as test head 300), etc. Non-limiting examples of the communications port 912 can include, Ethernet cards (wireless or wired), serial ports, parallel ports, etc.

The computing device 900 can also include an input/output (I/O) device 914. The I/O device 914 can allow the computing device 900 to receive and output information. Non-limiting examples of the I/O device 914 can include, a camera (still or video), a printer, a scanner, a monitor, etc.

The computing device 900 can be implemented using a personal computer, a network computer, a mainframe, a handheld device, a personal digital assistant, a smartphone, or any other similar microcomputer-based workstation. The computing device 900 can be a standalone device or can be combined with another device. For example, the computing device 900 may be a desktop computer used by a user that is connect to a spectrometer. In addition, the computing device 900 can be integrated into a spectrometer. In this instance, the computer device 900 can also include software, stored in the software module 904, that can control the test heads and other equipment used to collect data as described herein.

The term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions for execution by a machine (e.g., the computing device 900 or any other module) and that cause the machine to perform any one or more of the techniques of the present disclosure, or that is capable of storing, encoding or carrying data structures used by or associated with such instructions. In other words, the processor 902 can include instructions and can therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions may further be transmitted or received over a communications network using a transmission medium utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

The term "transmission medium" shall be taken to include any intangible medium that is capable of storing, encoding or carrying instructions for execution by hardware processing circuitry, and includes digital or analog communications signals or other intangible medium to facilitate communication of such software.

The systems and methods disclosed herein may achieve an absolute accuracy of +/−0.5° C. for all of the temperature sensors and sensor to sensor accuracy of +/−0.25° C. may be achieved. Static repeatability (i.e., precision over tolerance ratio of 10% or greater) may be obtained for the various temperature sensors. Dynamic repeatability (i.e., precision over tolerance ratio of 20% or greater) may be obtained using the systems and methods disclosed herein.

Power consumption (i.e., absorption) by the test head 300 may be less than 1% of heater surface power for a 1000 W heater. In other words, the test head 300 may consume less than 10 W. For example, during operation, the test head 300 may absorb less than 1 W. In other words, during use, the metrologies disclosed herein may require very little power to provide the results.

Figure 10:
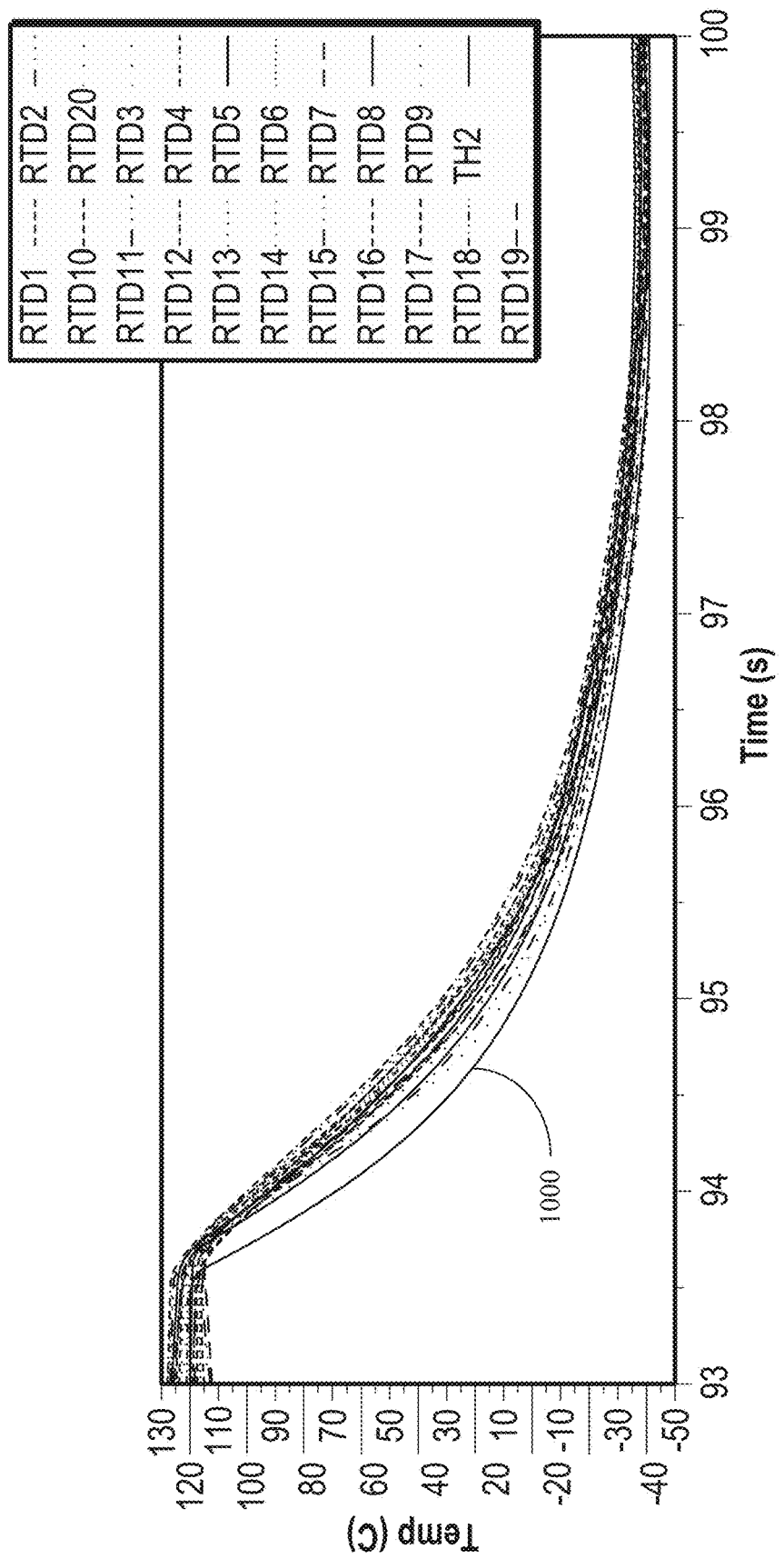
FIG. 10 illustrates a plot showing a dynamic temperature response in accordance with some embodiments disclosed herein.

Under dynamic conditions, the response time of the systems and methods disclosed herein may be targeted to be less than 0.1 s. FIG. 10 illustrates a plot showing a temperature change from 120 C target to −40 C for 20 resistance temperature devices (i.e., temperatures sensors 612). Line 1000 represents a controlled surface (i.e., the temperature of the calibration block) while the remaining lines represent individual sensors. As shown in FIG. 10, the time delay between change onset and reference sensor is less than 250 ms.

Figure 11:
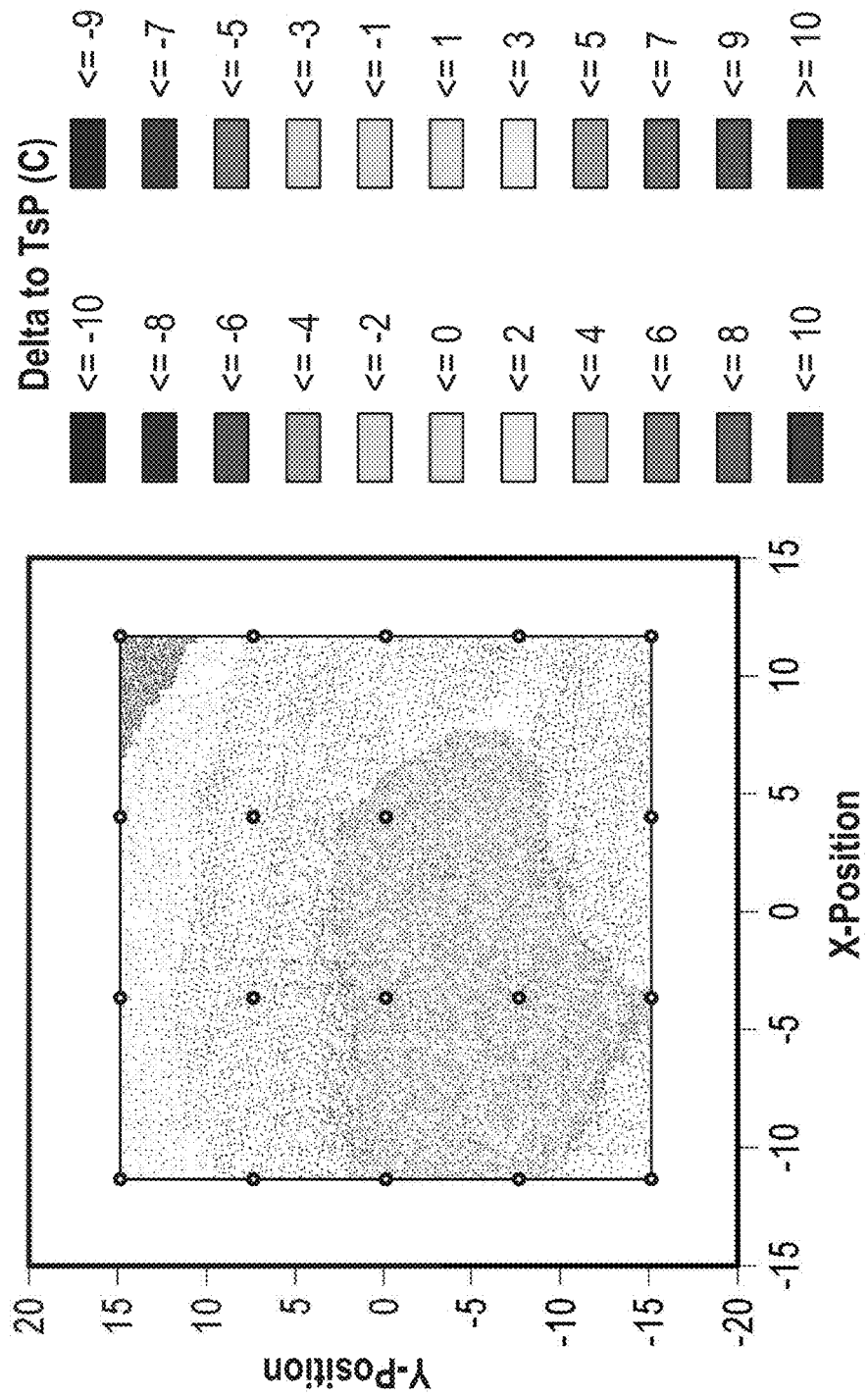
FIG. 11 illustrates a contour plot in accordance with some embodiments disclosed herein.

FIG. 11 illustrates a contour plot in accordance with some embodiments disclosed herein. The contour plot may be displayed either as a steady-state (average) or as a dynamic response with a variable time component. As shown in FIG. 11, the actual temperature of a measured surface may be found using the systems and methods disclosed herein. In FIG. 11 the relative sensor location along the X and Y axis are shown and the units are in units of millimeters.

ADDITIONAL NOTES & EXAMPLES

Example 1 is a system for measuring a surface temperature, the system comprising: a printed circuit board; an insulator block; a conductive probe having a first surface and a second surface opposite the first surface, the conductive probe coupled to the insulator block; a plurality of temperature sensors coupled to the insulator block and translatable in a first direction within the insulator block, wherein translation of the plurality of temperature sensors in the first direction causes each of the plurality of temperature sensors to contact the first surface of the conductive probe; and a plurality of compressive contact pins, each of the plurality of compressive contact pins electrically coupling a corresponding temperature sensor to the printed circuit board.

In Example 2, the subject matter of Example 1 optionally includes wherein the temperature sensors include resistant temperature devices.

In Example 3, the subject matter of any one or more of Examples 1 and 2 optionally include wherein the temperature sensors include thermocouples.

In Example 4, the subject matter of any one or more of Examples 1-3 optionally include wherein each of the plurality of compressive contact pins is a double-actuated compressive contact pin.

In Example 5, the subject matter of any one or more of Examples 1-4 optionally include wherein the interposer is manufactured from a non-electrically conductive material.

In Example 6, the subject matter of any one or more of Examples 1-5 optionally include wherein the conductive probe is manufactured from silicon carbide.

In Example 7, the subject matter of any one or more of Examples 1-6 optionally include wherein the conductive probe is manufactured from diamond.

In Example 8, the subject matter of any one or more of Examples 1-7 optionally include wherein the conductive probe has a surface roughness between about 0.1 microns and about 0.2 microns.

In Example 9, the subject matter of any one or more of Examples 1-8 optionally include wherein the conductive probe has a thermal conductivity of at least 400 watts per meter Kelvin.

In Example 10, the subject matter of any one or more of Examples 1-9 optionally include wherein the conductive probe is substantially thin.

In Example 11, the subject matter of Example 10 optionally includes wherein a length and a width of the conductive probe each are at least one order of magnitude greater than a thickness of the conductive probe.

In Example 12, the subject matter of any one or more of Examples 1-11 optionally include wherein the conductive probe is configured to conform to a test surface of a sample when pressed against the test surface.

In Example 13, the subject matter of any one or more of Examples 1-12 optionally include wherein the plurality of temperature sensors are grouped into a plurality of subsets of temperature sensors, each subset of temperature sensors independently translatable in the first direction relative to other subsets of temperature sensors.

In Example 14, the subject matter of Example 13 optionally includes wherein each subset of temperature sensors contains four temperature sensors.

In Example 15, the subject matter of any one or more of Examples 1-14 optionally include wherein each of the temperature sensors utilizes a four-wire measurement.

Example 16 is a system for measuring a surface temperature, comprising: a plurality of means for sensing a surface temperature; means for housing the sensing means, the sensing means translatable in a first direction within the housing means; means for absorbing a compression force created by contact between the sensing means and a sample; and means for conducting energy from the sample to the sensing means, the conducting mounts connected to the housing means.

In Example 17, the subject matter of Example 16 optionally includes wherein the plurality of sensing means includes a plurality of resistant temperature devices.

In Example 18, the subject matter of any one or more of Examples 16 and 17 optionally include wherein the plurality of sensing means includes a plurality of thermocouples.

In Example 19, the subject matter of any one or more of Examples 16-18 optionally include wherein each of the absorbing means includes a plurality of double-actuated compressive contact pin.

In Example 20, the subject matter of any one or more of Examples 16-19 optionally include wherein the housing means is manufactured from a non-electrically conductive material.

In Example 21, the subject matter of any one or more of Examples 16-20 optionally include wherein the conducting means includes a silicon carbide plate.

In Example 22, the subject matter of any one or more of Examples 16-21 optionally include wherein the conducting means includes a diamond plate.

In Example 23, the subject matter of any one or more of Examples 16-22 optionally include wherein the conducting means includes a surface roughness between about 0.1 microns and about 0.2 microns.

In Example 24, the subject matter of any one or more of Examples 16-23 optionally include wherein the conducting means has a thermal conductivity of at least 400 watts per meter Kelvin.

In Example 25, the subject matter of any one or more of Examples 16-24 optionally include wherein the conducting means is substantially thin.

In Example 26, the subject matter of Example 25 optionally includes wherein a length and a width of the conducting means each are at least one order of magnitude greater than a thickness of the conducting means.

In Example 27, the subject matter of any one or more of Examples 16-26 optionally include wherein the conducting means is configured to conform to a test surface of the sample when pressed against the test surface.

In Example 28, the subject matter of any one or more of Examples 16-27 optionally include wherein the plurality of sensing means are grouped into a plurality of subsets of sensing means, each subset of sensing means independently translatable in the first direction relative to other subsets of sensing means.

In Example 29, the subject matter of Example 28 optionally includes wherein each subset of temperature sensors contains four temperature sensors.

Example 30 is a system for measuring a surface temperature, the system comprising: a processor; and a memory storing instructions that, when executed by the processor, cause the processor to perform operations comprising: receiving an electrical signal from each of a plurality of temperature sensors coupled to an insulator block, each temperature sensor in contact with a first side of a conductive probe, a second side of the conductive probe in contact with a surface of a sample, correlating the electrical signal from each of the plurality of temperature sensors into a temperature profile for the surface of the sample, and transmitting the temperature profile to an output device.

In Example 31, the subject matter of Example 30 optionally includes wherein the temperature sensors include resistant temperature devices.

In Example 32, the subject matter of Example 31 optionally includes wherein the temperature sensors include thermocouples.

In Example 33, the subject matter of any one or more of Examples 30-32 optionally include wherein the plurality of temperature sensors are housed in a non-electrically conductive material.

In Example 34, the subject matter of any one or more of Examples 30-33 optionally include wherein the conductive probe is manufactured from silicon carbide.

In Example 35, the subject matter of any one or more of Examples 30-34 optionally include wherein the conductive probe is manufactured from diamond.

In Example 36, the subject matter of any one or more of Examples 30-35 optionally include wherein the conductive probe has a surface roughness between about 0.1 microns and about 0.2 microns.

In Example 37, the subject matter of any one or more of Examples 30-36 optionally include wherein the conductive probe has a thermal conductivity of at least 400 watts per meter Kelvin.

In Example 38, the subject matter of any one or more of Examples 30-37 optionally include wherein the conductive probe is substantially thin.

In Example 39, the subject matter of Example 38 optionally includes wherein a length and a width of the conductive probe each are at least one order of magnitude greater than a thickness of the conductive probe.

In Example 40, the subject matter of any one or more of Examples 30-39 optionally include wherein the conductive probe is configured to conform to the surface of the sample when pressed against the test surface.

In Example 41, the subject matter of any one or more of Examples 30-40 optionally include wherein the plurality of temperature sensors are grouped into a plurality of subsets of temperature sensors, each subset of temperature sensors independently translatable in the first direction relative to other subsets of temperature sensors.

In Example 42, the subject matter of Example 41 optionally includes wherein each subset of temperature sensors contains four temperature sensors.

In Example 43, the subject matter of any one or more of Examples 30-42 optionally include wherein each of the temperature sensors is in electrical communication with the processor via a four-wire connection.

In Example 44, the subject matter of any one or more of Examples 30-43 optionally include wherein the electrical signal corresponds to a resistance within a corresponding temperature sensor.

In Example 45, the subject matter of any one or more of Examples 30-44 optionally include wherein the electrical signal corresponds to a voltage across a corresponding temperature sensor.

Example 46 is a method measuring a surface temperature of a sample, the method comprising: place a surface of the sample in contact with a plurality of temperature sensors, the plurality of temperature sensors coupled to an insulator block and translatable in a first direction within the insulator block; pressing a first surface of a conductive probe against the surface of the sample such that the plurality of temperature sensors translates in the first direction and contact a second surface of the conductive probe; receiving an electrical signal from each of the plurality of temperature sensors at a processor; correlating the electrical signal from each of the plurality of temperature sensors into a temperature profile for the surface of the sample; and transmitting the temperature profile to an output device.

In Example 47, the subject matter of Example 46 optionally includes wherein the electrical signals are received via a four wire electrical connection.

In Example 48, the subject matter of any one or more of Examples 46 and 47 optionally include wherein pressing the first surface of the conductive probe against the surface of the sample includes causing the first surface of the conductive probe to conform to a shape of the surface of the sample.

In Example 49, the subject matter of any one or more of Examples 46-48 optionally include wherein receiving the electrical signal from each of the plurality of temperature sensors includes receiving multiple electrical signals from each of the plurality of temperature sensors, each of the plurality of electrical signals received a different time interval.

In Example 50, the subject matter of any one or more of Examples 46-49 optionally include calibrating each of the plurality of temperature sensors to minimize contact resistance.

Example 51 is at least one computer-readable medium comprising instructions to perform any of the methods of Examples 46-50.

Example 52 is an apparatus comprising means for performing any of the methods of Example 46-50.

Example 53 is at least one computer-readable medium comprising instructions that, when executed by a processor, cause the process to perform operations comprising: receiving an electrical signal from each of a plurality of temperature sensors coupled to an insulator block, each temperature sensor in contact with a first side of a conductive probe, a second side of the conductive probe in contact with a surface of a sample; correlating the electrical signal from each of the plurality of temperature sensors into a temperature profile for the surface of the sample; and transmitting the temperature profile to an output device.

In Example 54, the subject matter of Example 53 optionally includes wherein each of the temperature sensors is in electrical communication with the processor via a four-wire connection.

In Example 55, the subject matter of any one or more of Examples 53-54 optionally include wherein the electrical signal corresponds to a resistance within a corresponding temperature sensor.

In Example 56, the subject matter of any one or more of Examples 53-55 optionally include wherein the electrical signal corresponds to a voltage across a corresponding temperature sensor.

In Example 57, the subject matter of any one or more of Examples 53-56 optionally include wherein receiving the electrical signal from each of the plurality of temperature sensors includes receiving multiple electrical signals from each of the plurality of temperature sensors, each of the plurality of electrical signals received a different time interval.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B hut not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A system for measuring a surface temperature, the system comprising:

a printed circuit board;

an insulator block;

a conductive probe having a first surface and a second surface opposite the first surface, the conductive probe coupled to the insulator block;

a plurality of temperature sensors coupled to the insulator block and translatable in a first direction within the insulator block, wherein translation of the plurality of temperature sensors in the first direction causes each of the plurality of temperature sensors to contact the first surface of the conductive probe; and a plurality of compressive contact pins, each of the plurality of compressive contact pins electrically coupling a corresponding temperature sensor to the printed circuit board.

2. The system of claim 1, wherein the temperature sensors include resistant temperature devices.

3. The system of claim 1, wherein each of the plurality of compressive contact pins is a double-actuated compressive contact pin.

4. The system of claim 1, wherein the conductive probe is manufactured from silicon carbide.

5. The system of claim 1, wherein the conductive probe has a surface roughness between about 0.1 microns and about 0.2 microns.

6. The system of claim 1, wherein the conductive probe has a thermal conductivity of at least 400 watts per meter Kelvin.

7. The system of claim 1, wherein a length and a width of the conductive probe each are at least one order of magnitude greater than a thickness of the conductive probe.

8. The system of claim 1, wherein the conductive probe is configured to conform to a test surface of a sample when pressed against the test surface.

9. The system of claim 1, wherein the temperature sensors include thermocouples.

10. The system of claim 1, wherein the insulator block is manufactured from a non-electrically conductive material.

11. The system of claim 1, wherein the conductive probe is manufactured from diamond.

12. The system of claim 1, wherein the conductive probe is substantially thin.

13. The system of claim 1, wherein each of the temperature sensors utilizes a four-wire measurement.

14. The system of claim 1, wherein the plurality of temperature sensors are grouped into a plurality of subsets of temperature sensors, each subset of temperature sensors independently translatable in the first direction relative to other subsets of temperature sensors.

15. The system of claim 14, wherein each subset of temperature sensors contains four temperature sensors.

* * * * *